United States Patent Office.

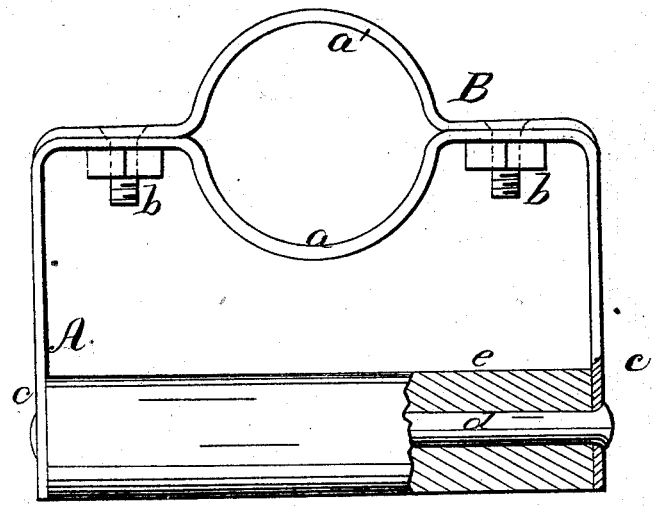
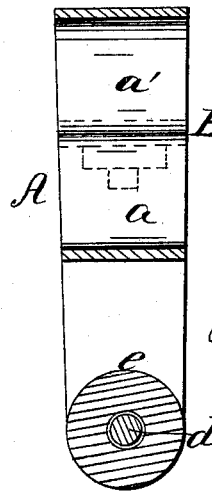

JAMES N. PEASE, OF PANAMA, NEW YORK.

Letters Patent No. 61,859, dated February 5, 1867.

IMPROVEMENT IN ADJUSTABLE HANDLES FOR SHOVELS AND FORKS.

*The Schedule referred to in these Letters Patent and making part of the same.*

TO ALL WHOM IT MAY CONCERN:

Be it known that I, JAMES N. PEASE, of Panama, in the county of Chautauqua, and State of New York, have invented a new and improved Handle-Attachment for Shovels, Manure Forks, and similar implements; and I do hereby declare that the following is a full, clear, and exact description thereof, which will enable others skilled in the art to make and use the same, reference being had to the accompanying drawings, forming part of this specification, in which—

Figure 1 is a side view of my invention, partly in section.

Figure 2, a transverse central section of the same.

Similar letters of reference indicate like parts.

This invention consists of a handle constructed and arranged in such a manner that it may be applied to the handle or stale of a shovel, manure fork, hay fork, or other similar implement, and greatly facilitate the manipulation thereof.

A represents a metal frame constructed of a bar bent so as to form three sides of a quadrangle, the central side being bent or curved so as to have a semicircular indentation or recess, $a$, as shown in fig. 1. B is a bar which is secured by bolts, $b$, to the outer surface of the central side of the frame, the bar B being also bent or curved so as to have a semicircular indentation or recess, $a'$, directly opposite the indentation or recess $a$, in the central side of frame A, the two indentations or recesses $a\ a'$ forming a circle and grasping the stale or handle of the implement to which the device is applied, a firm attachment being obtained by screwing up the nuts of the bolts $b$. Between the outer ends of the sides $c\ c$ of the frame A there is secured a rod, $d$, on which a wooden cylinder, $e$, is fitted. This device is clamped to the stale or handle of the implement between its two ends. When applied to a shovel-handle, for instance, the wooden cylinder is at the outer side above or in front of the stale or handle, so that the hand of the operator may grasp, $c$, without stooping as much as is now required in consequence of the hand grasping the stale or handle. The shovel-handle is of course provided with the ordinary attachment at its end for the right hand to grasp, the left hand grasping the cylinder $e$ of my implement.

This simple attachment not only affords a firm hold for the left hand of the operator, but also causes much stooping to be avoided in manipulating the implement.

Having thus described my invention, I claim as new, and desire to secure by Letters Patent—

The supplemental handle-attachment, constructed substantially as shown and described, for the purpose of being applied to the stale or handles of shovels, manure forks, and other similar implements, as set forth.

The above specification of my invention signed by me this 4th day of June. 1866.

JAMES N. PEASE.

Witnesses:
ISAAC N. PEASE,
M. J. PEASE.